(12) United States Patent
Shimada et al.

(10) Patent No.: US 11,193,777 B2
(45) Date of Patent: Dec. 7, 2021

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Satoshi Shimada, Chiryu (JP); Kazuhiko Nakanishi, Kariya (JP); Yuko Mizuno, Nagoya (JP); Masayuki Matsuda, Seto (JP); Takuya Maekawa, Nisshin (JP); Yorichika Ishiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 16/453,080

(22) Filed: Jun. 26, 2019

(65) Prior Publication Data

US 2020/0011686 A1 Jan. 9, 2020

(30) Foreign Application Priority Data

Jul. 5, 2018 (JP) .............................. JP2018-128286

(51) Int. Cl.
| | | |
|---|---|---|
| *G01C 21/34* | (2006.01) | |
| *G01C 21/00* | (2006.01) | |
| *G08G 1/16* | (2006.01) | |
| *G05D 1/00* | (2006.01) | |
| *G07B 15/00* | (2011.01) | |
| *G07B 15/02* | (2011.01) | |
| *G07B 15/06* | (2011.01) | |
| *G07C 5/08* | (2006.01) | |

(52) U.S. Cl.
CPC ...... *G01C 21/3461* (2013.01); *G01C 21/3438* (2013.01); *G05D 1/0088* (2013.01); *G07C 5/08* (2013.01)

(58) Field of Classification Search
CPC .. G01C 21/3461; G01C 21/3438; G07C 5/08; G07C 5/00; G05D 1/0088; G05D 1/00; G07B 15/063; G07B 15/00; G07B 15/02; G07B 15/06; G08G 1/16; G08G 1/123; G06Q 10/00; G06Q 10/02; G06Q 10/06; G06Q 50/30
See application file for complete search history.

(56) References Cited

U.S. PATENT DOCUMENTS

| | | | | |
|---|---|---|---|---|
| 7,840,427 B2* | 11/2010 | O'Sullivan | ............ | G06Q 10/02 705/6 |
| 2010/0161392 A1 | 6/2010 | Ashby et al. | | |
| 2010/0201505 A1* | 8/2010 | Honary | ................. | G08G 1/207 340/425.5 |
| 2012/0215594 A1* | 8/2012 | Gravelle | ................ | G07B 15/02 705/13 |

(Continued)

FOREIGN PATENT DOCUMENTS

| | | |
|---|---|---|
| JP | 6093169 B2 | 3/2017 |
| JP | 2018-055538 A | 4/2018 |

*Primary Examiner* — Yonel Beaulieu
(74) *Attorney, Agent, or Firm* — Oliff PLC

(57) ABSTRACT

An information processing apparatus comprises a controller configured to acquire information for identifying a vehicle conducting ride-sharing; and instruct a management apparatus of a toll road to apply preferential treatment when the vehicle conducting the ride-sharing travels along the toll road.

11 Claims, 12 Drawing Sheets

(56) References Cited

U.S. PATENT DOCUMENTS

| | | | |
|---|---|---|---|
| 2013/0054281 A1* | 2/2013 | Thakkar | G06Q 50/30 |
| | | | 705/5 |
| 2014/0180773 A1* | 6/2014 | Zafiroglu | G07B 15/063 |
| | | | 705/13 |
| 2014/0278841 A1* | 9/2014 | Natinsky | G07B 15/063 |
| | | | 705/13 |
| 2016/0364823 A1* | 12/2016 | Cao | G06Q 50/30 |
| 2018/0189717 A1* | 7/2018 | Cao | G06Q 10/083 |
| 2019/0172351 A1* | 6/2019 | O'Sullivan | G06Q 10/063112 |

* cited by examiner

| DRIVER ID | DEPARTURE PLACE (PICK-UP PLACE) | PICK-UP TIME | DESTINATION (DROP-OFF PLACE) | CAPACITY FOR OCCUPANTS | VEHICLE IDENTIFICATION INFORMATION |
|---|---|---|---|---|---|
| D1101 | TOKYO METROPOLITAN | MM-DD, AT HH TO HH O'CLOCK | TOKYO METROPOLITAN | 3 | C1111 |
| D1102 | KANAGAWA PREFECTURE | MM-DD, AT AROUND HH:MM | TOKYO METROPOLITAN | 1 | C1112 |
| D1103 | AICHI PREFECTURE | MM-DD, AT AROUND HH:MM | SHIZUOKA PREFECTURE | 4 | C1113 |
| D1104 | OSAKA PREFECTURE | MM-DD, AT HH TO HH O'CLOCK | OSAKA PREFECTURE | 6 | C1114 |
| D1105 | KYOTO PREFECTURE | NO CONDITION | HYOGO PREFECTURE | 2 | ⋮ |
| D1106 | ⋮ | ⋮ | ⋮ | ⋮ | ⋮ |

FIG. 8

| RIDE-SHARING SEEKER ID | DEPARTURE PLACE (PICK-UP PLACE) | PICK-UP TIME | DESTINATION (DROP-OFF PLACE) | NUMBER OF OCCUPANTS |
|---|---|---|---|---|
| S1101 | AICHI PREFECTURE | MM-DD, AT AROUND HH:MM | AICHI PREFECTURE | 1 |
| S1102 | AICHI PREFECTURE | MM-DD, AT HH TO HH' O'CLOCK | MIE PREFECTURE | 1 |
| S1103 | TOKYO METROPOLITAN | NO CONDITION | NAGANO PREFECTURE | 2 |
| S1104 | TOKYO METROPOLITAN | MM-DD, AT AROUND HH:MM | TOKYO METROPOLITAN | 3 |
| S1105 | OSAKA PREFECTURE | NO CONDITION | HIROSHIMA PREFECTURE | 1 |
| S1106 | ... | ... | ... | ... |
| ... | ... | ... | ... | ... |

FIG. 9

INFORMATION PROCESSING APPARATUS AND INFORMATION PROCESSING METHOD

CROSS REFERENCE TO THE RELATED APPLICATION

This application claims the priority of Japanese Patent Application No. 2018-128286, filed on Jul. 5, 2018, which is hereby incorporated by reference herein in its entirety.

BACKGROUND

Technical Field

The present disclosure relates to a technology for assisting in conduct of ride-sharing.

Description of the Related Art

In recent years, a so-called ride-sharing travel style, in which a plurality of users ride together in the same vehicle, has been widespread.

With respect to such a travel style, a technique is known for lowering inhibitions drivers may have about conduct of ride-sharing by allowing a driver to decide whether or not to accept riding with a ride-sharing seeker (for example, see Japanese Patent Laid-Open No. 2018-55538).

SUMMARY

If some incentive is given for conduct of ride-sharing, it can be thought that conduct of ride-sharing will be more invigorated. An object of the present disclosure is to provide a technology that enables a vehicle conducting ride-sharing to receive preferential treatment when the vehicle travels along a toll road.

The present disclosure in its one aspect provides an information processing apparatus comprising a controller configured to acquire information for identifying a vehicle conducting ride-sharing; and instruct a management apparatus of a toll road to apply preferential treatment when the vehicle conducting the ride-sharing travels along the toll road.

The present disclosure in its another aspect provides an information processing method comprising a first step of acquiring information for identifying a vehicle conducting ride-sharing; and a second step of instructing a management apparatus of a toll road to apply preferential treatment when the vehicle conducting the ride-sharing travels along the toll road.

A third aspect of the present disclosure is a program for causing a computer to execute the information processing method according to the above-mentioned second aspect, or a non-transitory computer readable storing medium storing the program.

According to the present disclosure, it is possible to provide a technology that enables a vehicle conducting ride-sharing to receive preferential treatment when the vehicle travels along a toll road.

BRIEF DESCRIPTION OF THE DRAWINGS

FIG. 8 illustrates an example of a table structure of driver information according to the second embodiment;

FIG. 9 illustrates an example of a table structure of ride-sharing seeker information according to the second embodiment;

DESCRIPTION OF THE EMBODIMENTS

An information processing apparatus according to a first aspect of the present disclosure includes a controller configured to acquire information for identifying a vehicle conducting ride-sharing and instruct a management apparatus of a toll road to apply preferential treatment when the vehicle conducing the ride-sharing travels along the toll road.

Note that the ride-sharing here refers to sharing a ride in a car and is established if there are a driver and one or more passengers. The information for identifying a vehicle conducting ride-sharing may identify the vehicle itself, or may identify the vehicle by identifying a driver of the vehicle. Specifically, a registration number of the vehicle, a terminal ID of equipment mounted on the vehicle, or the like can be used.

With the information processing apparatus as described above, it is possible to provide a system for assisting ride-sharing that enables a vehicle conducting ride-sharing to receive preferential treatment (that is, can give an incentive to a person conducting the ride-sharing) when the vehicle travels along a toll road.

Hereinafter, specific embodiments of the present disclosure will be described based on the drawings. Unless particularly stated otherwise, sizes, materials, shapes, relative arrangements, and the like of components described in the embodiments are not intended to limit the technical scope of the disclosure to such sizes, materials, shapes, relative arrangements, and the like.

First Embodiment (Outline of System)

Figure 1:
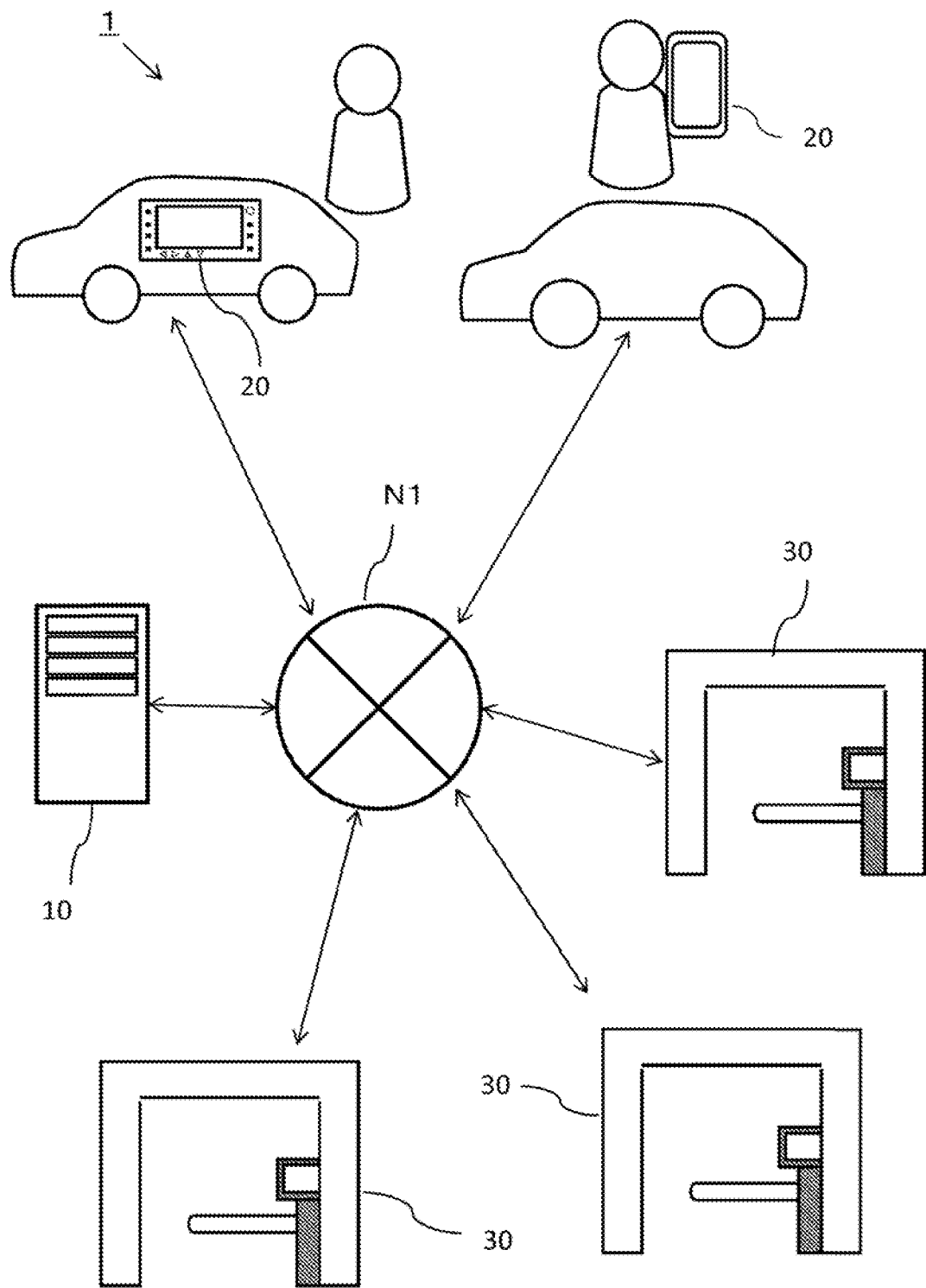
FIG. 1 is a schematic diagram of a ride-sharing assist system according to a first embodiment.

An outline of a ride-sharing assist system 1 according to a first embodiment will be described with reference to FIG. 1. The system according to the present embodiment is a system for assisting ride-sharing, including a server apparatus 10, vehicle terminals 20, and ETC apparatuses 30.

In the ride-sharing assist system 1, the server apparatus 10, the vehicle terminals 20, and the ETC apparatuses 30 are connected to each other through a network N1. For the network N1, for example, a WAN (Wide Area Network) that is a world-wide public communication network, such as the Internet, or any other communication network may be employed. The network N1 may include a telecommunication network for mobile telephones and the like and a wireless communication network such as Wi-Fi.

The server apparatus 10 is an apparatus that performs communication with at least one of the vehicle terminals 20 and with at least one of the ETC apparatuses 30 via the network N1 and performs predetermined information processing. In the present embodiment, the server apparatus 10 is the "information processing apparatus" according to the first aspect of the present disclosure.

The vehicle terminals 20 are terminal apparatuses managed by drivers conducting ride-sharing. For example, the vehicle terminals 20 may be in-car equipment mounted on vehicles that are provided for ride-sharing, or may be mobile information terminals such as smartphones owned by the drivers.

The ETC apparatuses 30 are apparatuses for automatically collecting tolls, deployed at entrances/exits of toll roads and vicinities thereof, and include gate apparatuses at the entrances/exits of the toll roads, vehicle detection apparatuses at vicinities of the entrances/exits, apparatuses for performing communication with the in-car apparatuses on the vehicles traveling along the toll roads, and the like. In the present specification, a group of the apparatuses for automatically collecting tolls, including such a plurality of types of mutually cooperating apparatuses, are referred to as the ETC apparatuses 30. Note that ETC is an abbreviation for Electronic Toll Collection System and means an automatic toll collection system for toll roads. In the present embodiment, each "ETC apparatus 30" is the "management apparatus of a toll road" according to the first aspect of the present disclosure.

(System Configuration)

Figure 2:
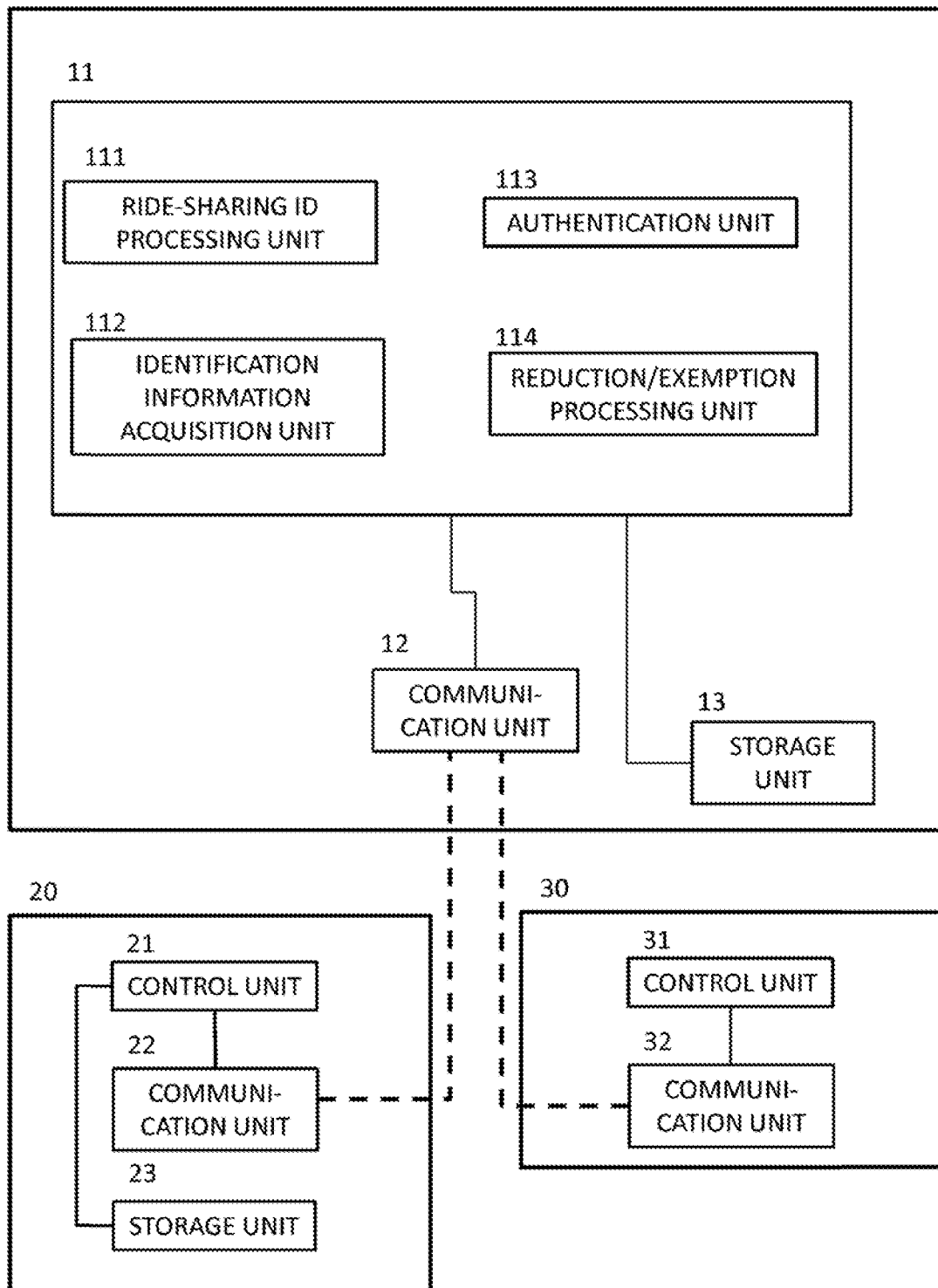
FIG. 2 is a block diagram schematically illustrating an example of constituent elements included in the ride-sharing assist system according to the first embodiment.

Constituent elements of the system will be described in detail. FIG. 2 is a block diagram schematically illustrating an example of components of the server apparatus 10, any one of the vehicle terminals 20, and any one of the ETC apparatuses 30 illustrated in FIG. 1.

(Server Apparatus)

The server apparatus 10 is composed of a general computer. That is, the server apparatus 10 is a computer including a processor such as a CPU or a DSP, a main storage unit such as a read only memory (ROM) or a random access memory (RAM), and an auxiliary storage unit such as an EPROM, a hard disk drive (HDD), or a removable medium. Note that the removable medium is, for example, a flash memory such as a USB memory or an SD card, or a disk recording medium such as a CD-ROM, a DVD disk, or a Blu-ray Disc. An operating system (OS), various programs, various tables, and the like are stored in the auxiliary storage unit, and the stored programs are loaded into a work area of the main storage unit and executed, and each of the constituent units and the like is controlled through the execution of the programs. Thus, each functional unit fulfilling a predetermined purpose, which will be described later, can be implemented. However, part or all of the functional units may be implemented by using a hardware circuit such as ASIC or FPGA. Note that the server apparatus 10 may be composed of a single computer, or may be composed of a plurality of mutually cooperating computers.

The server apparatus 10 includes a control unit 11, a communication unit 12, and a storage unit 13. The control unit 11 is a unit that controls the server apparatus 10, and is composed of, for example, a CPU and the like. The control unit 11 includes, as functional modules, a ride-sharing ID processing unit 111, an identification information acquisition unit 112, an authentication unit 113, and a reduction/exemption processing unit 114. Each functional module may be implemented, for example, by causing the CPU to execute a program stored in storage unit such as a ROM.

The communication unit 12 is a communication unit for connecting the server apparatus 10 to the network N1. The communication unit 12 includes, for example, a LAN (Local Area Network) interface board and a wireless communication circuit for wireless communication.

The storage unit 13 is a unit for storing information and corresponds to the above-mentioned main storage unit and auxiliary storage unit. The storage unit 13 includes a database (DB) in which, for example, various information such as tolls on each toll road, reduction or exemption amounts on each toll road, and ride-sharing IDs, which will be described later, are stored. The database is built in such a manner that a database management system (DBMS) program executed by the processor manages data stored in the above-mentioned auxiliary storage unit.

Subsequently, each functional module included in the control unit 11 will be described. The ride-sharing ID processing unit 111 acquires a single ride-sharing ID corresponding to information on a single ride-sharing conduct plan on which agreement has been made between a driver and each passenger. The ride-sharing ID processing unit 111 transmits the ride-sharing ID to the vehicle terminal 20 of the driver involved in the ride-sharing conduct plan corresponding to the ID via the communication unit 12. The ride-sharing ID may be acquired, for example, from another system that manages ride-sharing operation, or the like.

Here, the information on a ride-sharing conduct plan includes information for identifying a vehicle conducting the ride-sharing, information related to a time of day for starting the ride-sharing, and information related to a pick-up place or a drop-off place (hereinafter, also referred to as pick-up and drop-off places) of the ride-sharing, and is information for identifying a specific ride-sharing plan. Note that the information for identifying a vehicle conducting the ride-sharing includes, for example, a registration number of the vehicle and a terminal ID of equipment mounted on the vehicle. Such information and the ride-sharing ID acquired by the ride-sharing ID processing unit 111 have a one-to-one correspondence, and therefore, in the present embodiment, the "ride-sharing ID" corresponds to the "information for identifying a vehicle conducting ride-sharing" according to the first aspect of the present disclosure.

Cases where "agreement has been made between a driver and each passenger" are not necessarily cases where agreement has been made directly between a driver and each passenger, but also include cases where agreement has been indirectly made via the above-mentioned ride-sharing operation management system.

The identification information acquisition unit 112 acquires the ride-sharing ID and an ETC identification information (ID) for identifying an ETC apparatus 30 on a toll road via the communication unit 12. Note that the ETC ID here is not necessarily one for identifying each individual apparatus included in the automatic toll collection system, but may be one for identifying a group of apparatuses that detect an entry of a vehicle into or an exit of a vehicle from a toll road at entrances/exits of the toll road. Note that in the present embodiment, the "ETC ID" corresponds to the "ETC identification information". The ETC identification information is information for identifying an ETC apparatus deployed on a toll road (that is, as roadside equipment), but is not information for identifying in-car equipment mounted on a vehicle.

The authentication unit 113 authenticates that the vehicle including the vehicle terminal 20 having the ride-sharing ID is detected by the ETC apparatus 30 having the ETC ID, based on the ride-sharing ID and the ETC ID acquired by the identification information acquisition unit 112. That is, the authentication unit 113 authenticates that the vehicle traveling along the toll road on which the ETC apparatus 30 according to the ETC ID is deployed is a vehicle that is conducting ride-sharing.

The reduction/exemption processing unit 114 performs processing for reducing or exempting a toll on the toll road along which the vehicle authenticated by the authentication unit 113 as conducting ride-sharing travels. Specifically, the reduction/exemption processing unit 114 may determine an amount of reduction or exemption based on a predetermined condition and may transmit the determined amount of reduction or exemption to the ETC apparatus 30 so that a toll to be actually paid by the driver can be reduced or exempted. Note that reduction or exemption may exempt a full toll on a section passed while ride-sharing is conducted, or may partially discount the toll. A discount rate may vary depending on a traveled distance, the number of occupants, a date of use, or the like. Such an amount of reduction or exemption may be calculated, for example, by using a relational expression or the like stored beforehand in the storage unit 13.

(Vehicle Terminal)

Each vehicle terminal 20 includes a control unit 21, a communication unit 22, a storage unit 23, and various input and output units. The control unit 21 is a unit that controls the vehicle terminal 20 and is composed of, for example, a CPU and the like. The communication unit 22 includes a communication unit for connecting the vehicle terminal 20 to the network N1 and a unit for performing wireless communication with the ETC apparatuses 30. Each vehicle terminal 20 is not limited to in-car equipment mounted on a vehicle, but may be a general-purpose information terminal owned by a driver, such as a smartphone, a tablet computer, a mobile computer, a mobile telephone, or a handy terminal.

(ETC Apparatus)

Each ETC apparatus 30 includes a control unit 31, a communication unit 32, and various input and output units. Each ETC apparatus 30 may include a storage unit. The control unit 31 is a unit that controls the ETC apparatus 30 and is composed of, for example, a CPU and the like. The communication unit 32 includes a communication unit for connecting the ETC apparatus 30 to the network N1 and a unit for performing wireless communication with the vehicle terminals 20.

(Flow of Processing)

Figure 3:
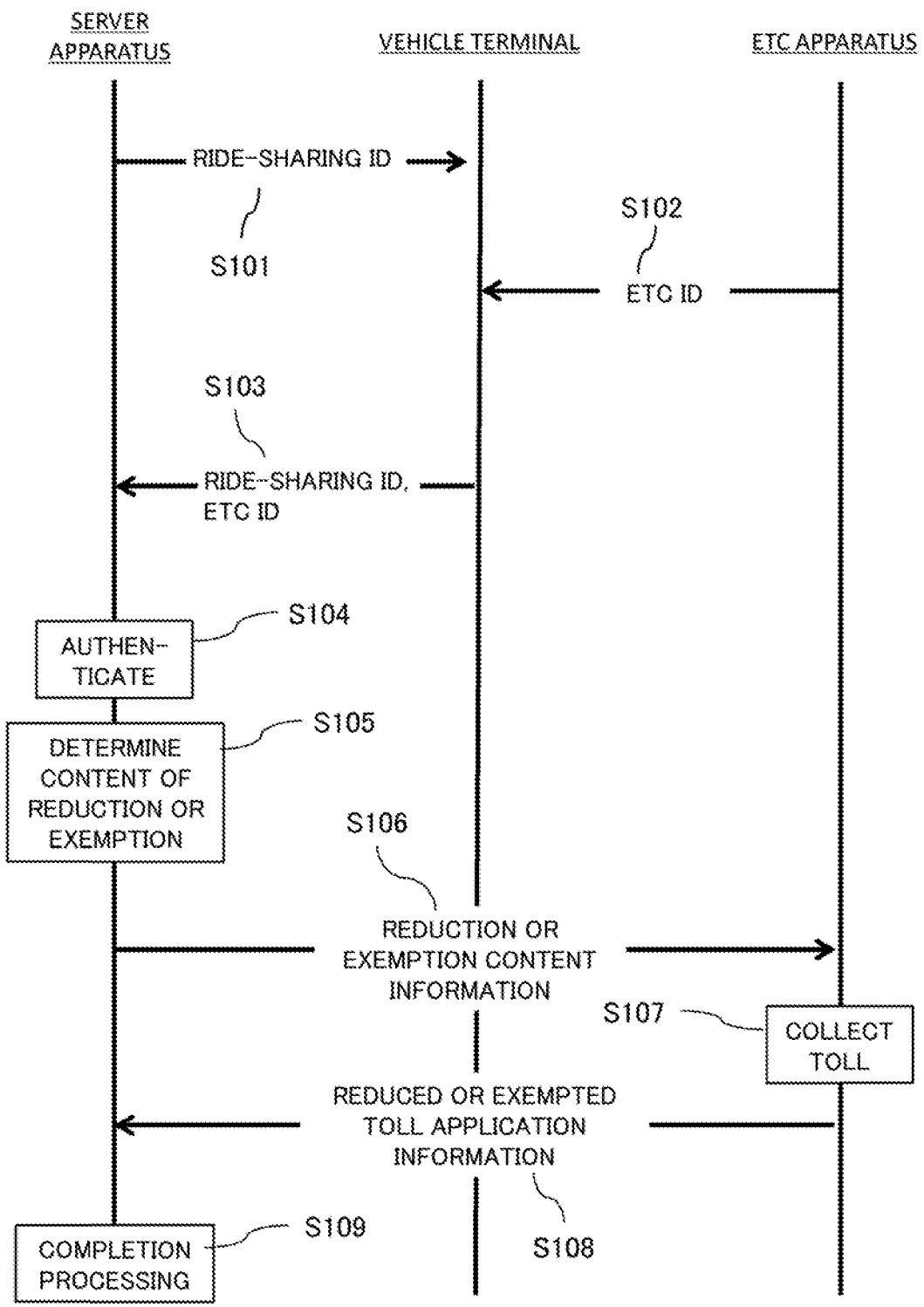
FIG. 3 is a diagram for describing a data flow in the system according to the first embodiment.

Next, processing performed by the above-described individual constituent elements will be described. FIG. 3 is a diagram for describing a data flow in the system according to the present embodiment. Note that in the present embodiment, a description will be given on a premise that a vehicle including a vehicle terminal 20 having a valid ride-sharing ID is conducting ride-sharing.

First, the server apparatus 10 transmits, from the ride-sharing ID processing unit 111, a ride-sharing ID related to conduct of a ride-sharing to a vehicle terminal 20 of a driver involved in the ride-sharing (step S101). The ride-sharing ID may be acquired, for example, from another system that manages ride-sharing operation.

The vehicle terminal 20 stores the ride-sharing ID received from the server apparatus 10 in the storage unit 23. The ride-sharing ID is stored as a valid ID until a predetermined release condition is met. When a vehicle on which the vehicle terminal 20 having the valid ride-sharing ID is mounted travels along a predetermined toll road, the vehicle terminal 20 acquires an ETC ID from an ETC apparatus 30 deployed near an entrance/exit of the toll road by approaching the ETC apparatus 30 and transmitting and receiving information to/from the ETC apparatus 30 (step S102).

Note that the above-mentioned "predetermined release condition" can be, for example, it being past a predetermined time of day, arriving at a destination, the vehicle terminal 20 acquiring authentication information for ride-sharing completion, or the like, or further may be any combination thereof. Acquisition of the above-mentioned ETC ID may be performed along with transmission and reception of information for automatic toll collection, or may be performed through transmission and reception of other information. A request signal requesting to transmit the ETC ID may be transmitted from the vehicle terminal 20 to the ETC apparatus 30.

The vehicle terminal 20 having acquired the ETC ID transmits the already stored ride-sharing ID and the ETC ID in a set to the server apparatus 10, and the server apparatus 10 receives the set of the ride-sharing ID and the ETC ID at the identification information acquisition unit 112 (step S103). Next, the server apparatus 10 performs authentication at the authentication unit 113, based on the ride-sharing ID and the ETC ID acquired in a set. Specifically, the server apparatus 10 authenticates that the vehicle traveling along the toll road on which the ETC apparatus 30 according to the ETC ID is deployed is the vehicle on which the vehicle terminal 20 having the ride-sharing ID is mounted, that is, the vehicle conducting ride-sharing (step S104). Here, the authentication may be performed by determining various conditions that, for example, the ride-sharing ID and the ETC ID are transmitted in a set, that the ride-sharing ID and the ETC ID are valid IDs, that there is no difference exceeding a predetermined reference value between a scheduled time of day for conducting ride-sharing and a time of day at which the IDs are transmitted, and the like.

If it is authenticated in step S104 that the vehicle on which the vehicle terminal 20 transmitting the ride-sharing ID and the ETC ID is mounted is conducting ride-sharing, the server apparatus 10 determines, at the reduction/exemption processing unit 114, an amount of reduction or exemption from a toll on the toll road for the vehicle (step S105). The server apparatus 10 transmits information on the amount of reduction or exemption along with the ride-sharing ID to the ETC apparatus 30 (step S106). The ETC apparatus 30 having acquired the information on the amount of reduction or exemption and the ride-sharing ID from the server apparatus 10 collects a toll for the vehicle on which the vehicle terminal 20 having the ride-sharing ID is mounted, in an amount after the amount of reduction or exemption is applied (step S107). The ETC apparatus 30 transmits to the server apparatus 10 information indicating that the amount after the amount of reduction or exemption is applied has been collected (step S108). The server apparatus 10 receives, at the reduction/exemption processing unit 114, the information indicating that reduction or exemption is applied, and completes the series of processing related to the ride-sharing ID (step S109).

Note that in the foregoing, the amount of reduction or exemption may be determined, for example, based on a factor such as a traveled distance, the number of passengers, a date and time of travel along the toll road, or a size (including a weight) of the vehicle. Information on relationships between combinations of such factors and amounts of reduction or exemption may be stored beforehand in the storage unit 13.

According to the configuration of the system of the present embodiment, a toll on a toll road for a vehicle that is conducting ride-sharing can be easily reduced or exempted, and thus an incentive can be given to a person who conducts the ride-sharing.

Modification Example

Figure 4:
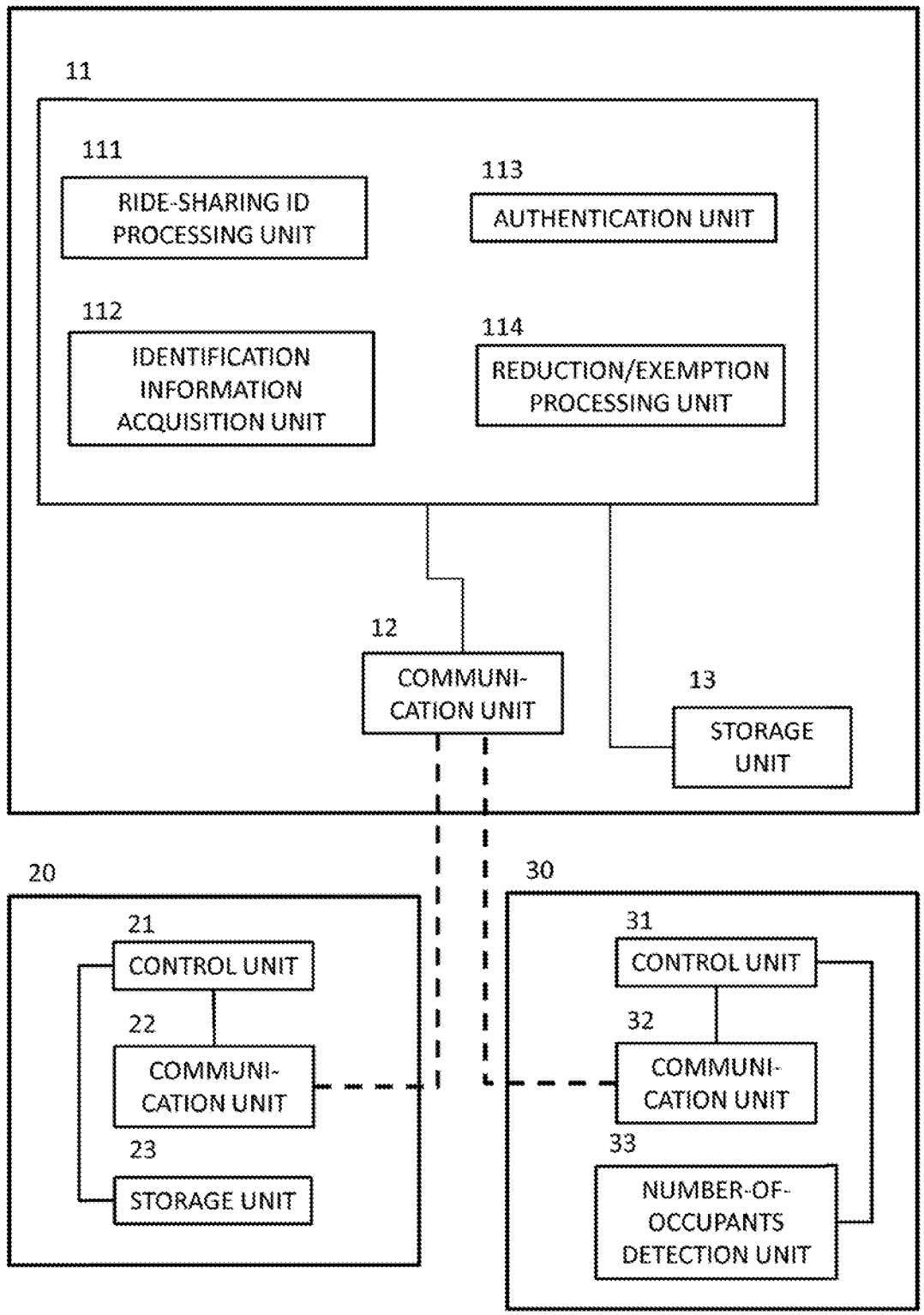
FIG. 4 is a block diagram schematically illustrating an example of constituent elements included in a modification example of the first embodiment.

Note that in the first embodiment, if the number of passengers involved in ride-sharing is used for a condition for determining an amount of reduction or exemption, the actual number of passengers may be checked. FIG. 4 depicts a block diagram illustrating an outline of a modification example of the first embodiment. As illustrated in FIG. 4, a system according to the present modification example is different from the first embodiment in that each ETC apparatus 30 includes a number-of-occupants detection unit 33. In the following, components and processing similar to the components and the processing in the first embodiment are denoted by the same reference signs, and a detailed description thereof will be omitted.

The number-of-occupants detection unit 33 of each ETC apparatus 30 includes, for example, a camera and an image analysis unit and detects the number of occupants riding in a vehicle by shooting the vehicle passing through an entrance/exit of the toll road by using the camera and analyzing a shot image. Note that the camera may be a thermal image camera and may detect the number of occupants by thermography. Note that the number of passengers can also be obtained by detecting the number of occupants because the number of passengers is obtained by subtracting one corresponding driver from the detected number of occupants.

Figure 5:
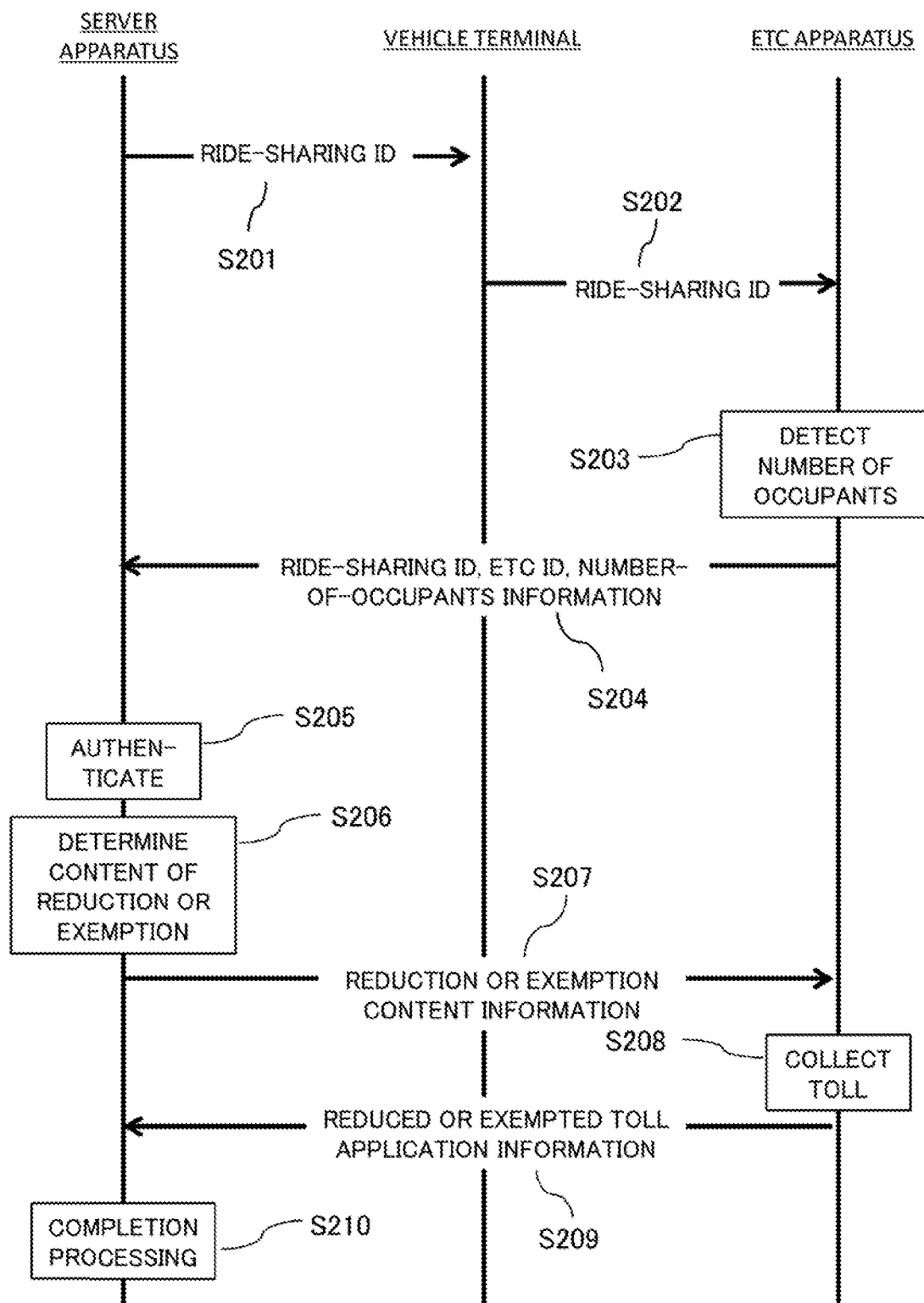
FIG. 5 is a diagram for describing a data flow in the modification example of the first embodiment.

Subsequently, a flow of processing in the present modification example will be described based on FIG. 5. FIG. 5 is a diagram for describing a data flow in the system according to the present modification example. As in the first embodiment, a vehicle terminal 20 having acquired a ride-sharing ID from the server apparatus 10 stores the ride-sharing ID in the storage unit 23 (step S201). When a vehicle on which the vehicle terminal 20 having the ride-sharing ID is mounted travels along a predetermined toll road, the vehicle terminal 20 transmits the ride-sharing ID to an ETC apparatus 30 deployed near an entrance/exit of the toll road (step S202). That is, in contrast to the first embodiment in which the vehicle terminal 20 acquires the ETC ID from the ETC apparatus 30, the present modification example is configured such that the ETC apparatus 30 acquires the ride-sharing ID from the vehicle terminal 20.

Further, the ETC apparatus 30 detects, at the number-of-occupants detection unit 33, the number of occupants in the vehicle on which the vehicle terminal 20 transmitting the ride-sharing ID is mounted (step S203). The ETC apparatus 30 transmits information on a set of the ride-sharing ID acquired in step S202 and an ETC ID for identifying the ETC apparatus 30 and information on the number of occupants detected in step S203 to the server apparatus 10, and the server apparatus 10 acquires the information at the identification information acquisition unit 112 (step S204).

The server apparatus 10 authenticates, at the authentication unit 113, that the vehicle traveling along the toll road on which the ETC apparatus 30 is deployed is a vehicle that is conducting ride-sharing, based on the ride-sharing ID and the ETC ID acquired in a set as in the first embodiment (step S205). Subsequently, the server apparatus 10 performs, at the reduction/exemption processing unit 114, processing for determining an amount of reduction or exemption (step S206). In this event, the server apparatus 10 refers to the information on the number of occupants acquired in step S204. In other words, the amount of reduction or exemption can vary depending on the number of occupants detected by the number-of-occupants detection unit 33 of the ETC apparatus 30. Each processing in step S207 to step S210 after the amount of reduction or exemption is determined is similar to step S106 to step S109 in the first embodiment, and therefore a description thereof will be omitted.

According to the configuration of the present modification example, the amount of reduction or exemption can be varied depending on the actual number of occupants (number of passengers) involved in conduct of ride-sharing. That is, a content of preferential treatment can be determined based on information on the number of occupants in a vehicle conducting ride-sharing.

Second Embodiment (System Configuration)

Figure 6:
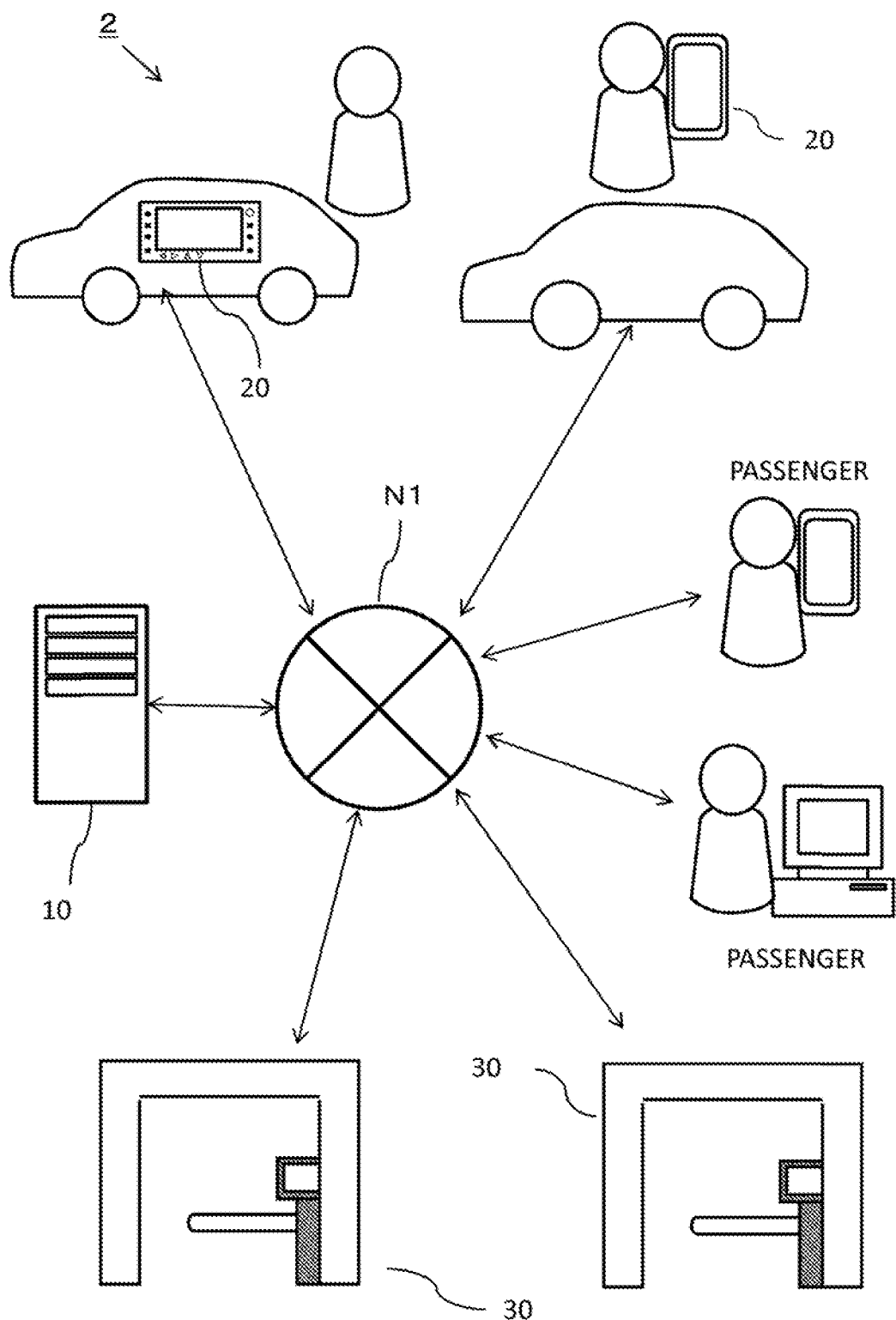
FIG. 6 is a schematic diagram of a ride-sharing assist system according to a second embodiment.

Next, a second embodiment of the present system will be described. FIG. 6 illustrates an outline of a ride-sharing assist system 2 according to the present embodiment. The ride-sharing assist system 2 according to the present embodiment is a system that concurrently manages ride-sharing operation, and includes a function of matching a driver in ride-sharing and a ride-sharing seeker.

Figure 7:
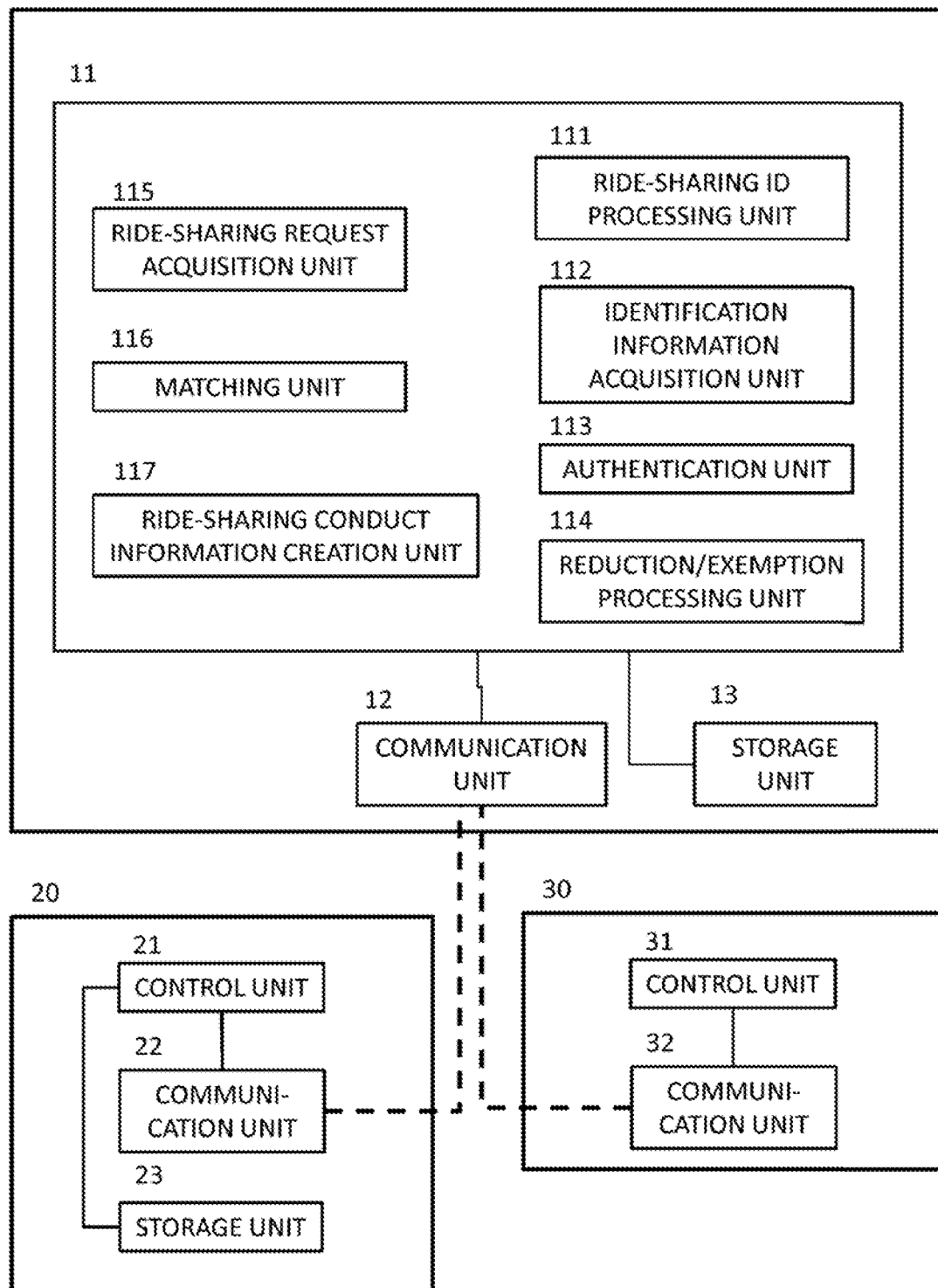
FIG. 7 is a block diagram schematically illustrating an example of constituent elements included in the ride-sharing assist system according to the second embodiment.

FIG. 7 is a block diagram schematically illustrating an example of components of a server apparatus 10, a vehicle terminal 20, and an ETC apparatus 30 according to the present embodiment. As illustrated in FIG. 7, the server apparatus 10 includes a ride-sharing request acquisition unit 115, a matching unit 116, and a ride-sharing conduct information creation unit 117 as functional modules of the control unit 11, in addition to the components in the first embodiment. Other components are similar to the components in the first embodiment.

The ride-sharing request acquisition unit 115 acquires information including a request from a driver calling for passengers in ride-sharing (hereinafter, referred to as driver information) and information including a request from a ride-sharing seeker calling for a vehicle conducting ride-sharing (hereinafter, referred to as ride-sharing seeker information) via the communication unit 12 and stores the information in the storage unit 13. Acquisition of each piece of information may be performed, for example, via a web site. In the web site, a user interface to enter information is displayed, and information is acquired and provided via the user interface.

The driver information and the ride-sharing seeker information are stored in the storage unit 13, for example, as a database in a table form. FIG. 8 illustrates an example of a table structure of the driver information, and FIG. 9 illustrates an example of a table structure of the ride-sharing seeker information.

As illustrated in FIG. 8, the driver information includes, as table components, a driver ID field, a departure place (pick-up place) field, a pick-up time field, a destination (drop-off place) field, a capacity for occupants field, a vehicle identification information field, and the like. Note that other than the above-mentioned components, attributes of a driver (gender, age, driving reputation, available language), attributes of an acceptable passenger (gender, age, available language), information on a vehicle used in ride-sharing (vehicle type, model year, non-smoking/smoking free), and the like may be included as fields.

As illustrated in FIG. 9, the ride-sharing seeker information includes, as table components, a ride-sharing seeker ID field, a departure place (pick-up place) field, a pick-up time field, a destination (drop-off place) field, a number of occupants field, and the like. Note that other than the above-mentioned components, attributes of a passenger, attributes of a desired driver, information on a vehicle used in ride-sharing (vehicle type, model year, non-smoking/ smoking free), and the like may be included as fields.

The matching unit 116 performs matching between a driver and a ride-sharing seeker, based on the driver information and the ride-sharing seeker information stored in the storage unit 13. "Matching" here refers to mediating between a driver and a ride-sharing seeker and, specifically, is to check the driver information against the ride-sharing seeker information and determine, for each pair of corresponding fields, whether or not any combination of agreeing conditions exists. If a combination of agreeing conditions exists, information indicating that a match occurs and information for final confirmation of conduct of ride-sharing are transmitted to each of the driver and the ride-sharing seeker who have transmitted the information. Note that taking the driver information in FIG. 8 and the ride-sharing seeker information in FIG. 9 as an example, a combination of agreeing conditions corresponds to a combination of driver information on a driver ID of D1001 and ride-sharing seeker information on a ride-sharing seeker ID of S1004. Specifically, a match occurs when conditions of the departure place (pick-up place), the pick-up time, the destination (drop-off place), and the number of occupants agree.

The ride-sharing conduct information creation unit 117 creates ride-sharing conduct information including a date and time for conducting ride-sharing and pick-up and drop-off places, based on the driver information and the ride-sharing seeker information between which a match occurs, and issues a new ride-sharing ID. The ride-sharing conduct information creation unit 117 stores the created ride-sharing conduct information and the newly issued ride-sharing ID in the storage unit 13 in association with each other.

Note that in the present embodiment, the ride-sharing ID processing unit 111 transmits the ride-sharing ID issued by the ride-sharing conduct information creation unit 117 to the vehicle terminal 20.

(Flow of Processing)

Figure 10:
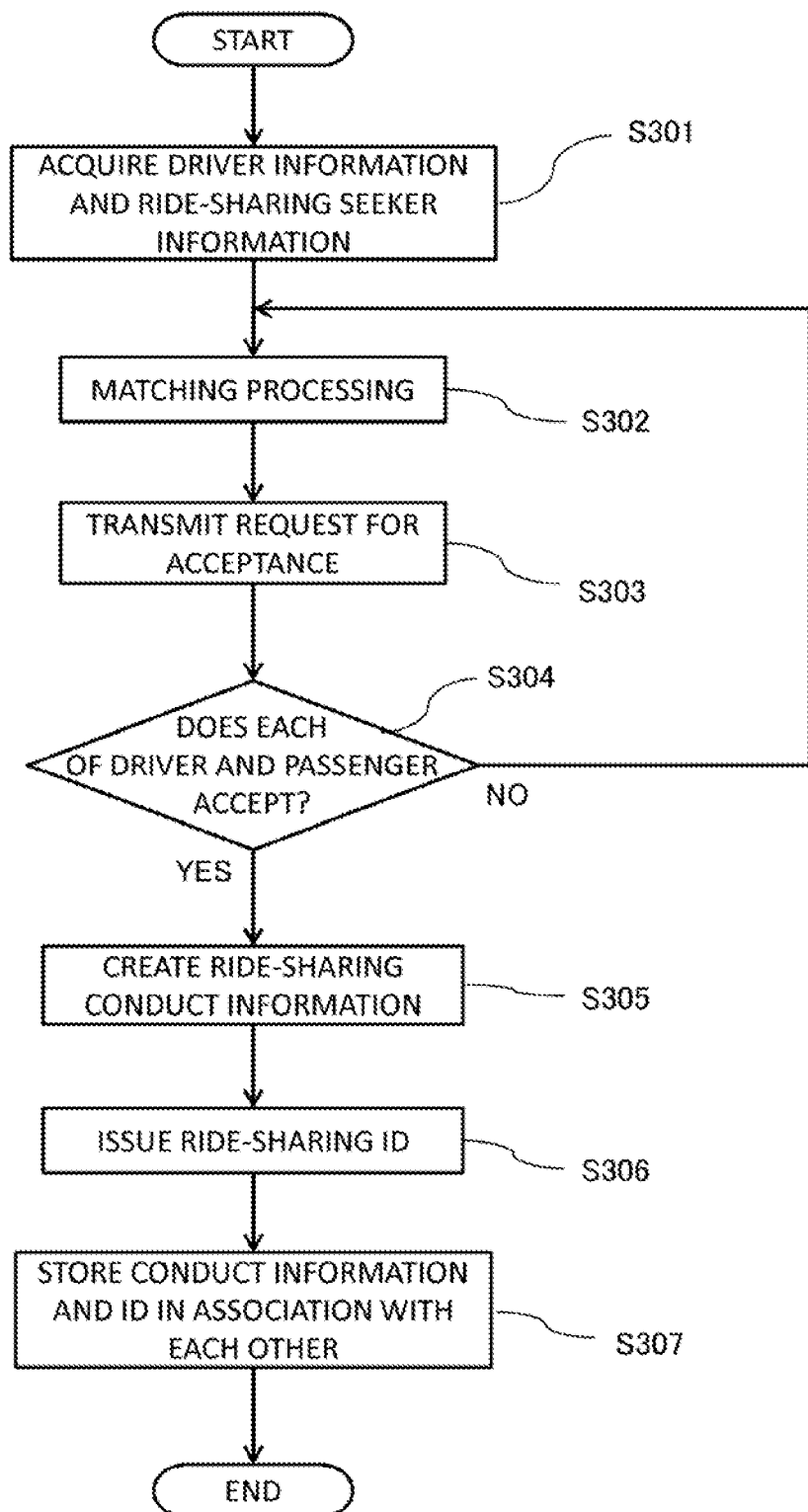
FIG. 10 is a flowchart illustrating a flow of a series of processing related to issuance of a ride-sharing ID in the second embodiment.

Subsequently, a flow of processing performed by the ride-sharing request acquisition unit 115, the matching unit 116, and the ride-sharing conduct information creation unit 117 in the present embodiment will be described based on FIG. 10. FIG. 10 is a flowchart illustrating a flow of a series of processing related to issuance of a ride-sharing ID in the present embodiment. The server apparatus 10 first acquires driver information and ride-sharing seeker information at the ride-sharing request acquisition unit 115 and stores the driver information and the ride-sharing seeker information in the storage unit 13 (step S301).

Next, the matching unit 116 searches for a combination of agreeing conditions in each pair of fields by checking the stored driver information against the stored ride-sharing seeker information and, if a combination of agreeing conditions is found, associates the relevant driver information and ride-sharing seeker information with each other (step S302; hereinafter, referred to as matching processing).

Then, information indicating that a match occurs and information requesting to accept conducing ride-sharing are transmitted to each of a driver who has transmitted the associated driver information and a ride-sharing seeker who has transmitted the associated ride-sharing seeker information (step S303).

Thereafter, it is determined whether or not information indicating acceptance of conducing ride-sharing is acquired from each of the driver and the ride-sharing seeker (step S304), and if acceptance is acquired from each of the driver and the ride-sharing seeker, processing advances to step S305. On the other hand, if acceptance is not acquired from at least one of the driver and the ride-sharing seeker in step S305, processing returns to step S302, and the subsequent processing is repeated.

In step S305, the ride-sharing conduct information creation unit 117 creates ride-sharing conduct information including a date and time for conducting ride-sharing and pick-up and drop-off places, based on the driver information and the ride-sharing seeker information between which a match occurs. Then, a new ride-sharing ID is issued (step S306), and the ride-sharing conduct information and the ride-sharing ID are associated with each other and stored in the storage unit (step S307).

As described above, a combination of the ride-sharing conduct information and the ride-sharing ID for identifying the ride-sharing conduct information is created, and the ride-sharing ID is transmitted to the vehicle terminal 20 by the ride-sharing ID processing unit 111. Note that a flow of processing in the ride-sharing assist system 2 according to the present embodiment after the ride-sharing ID is transmitted is similar to the flow of processing in the first embodiment, and therefore a description of the subsequent processing will be omitted.

According to the configuration of the present embodiment, a system that concurrently manages ride-sharing operation can be built, and services can be provided to drivers and ride-sharing seekers in a centralized manner, for example, from a web site such as a ride-sharing assist site.

Third Embodiment (System Configuration)

Figure 11:
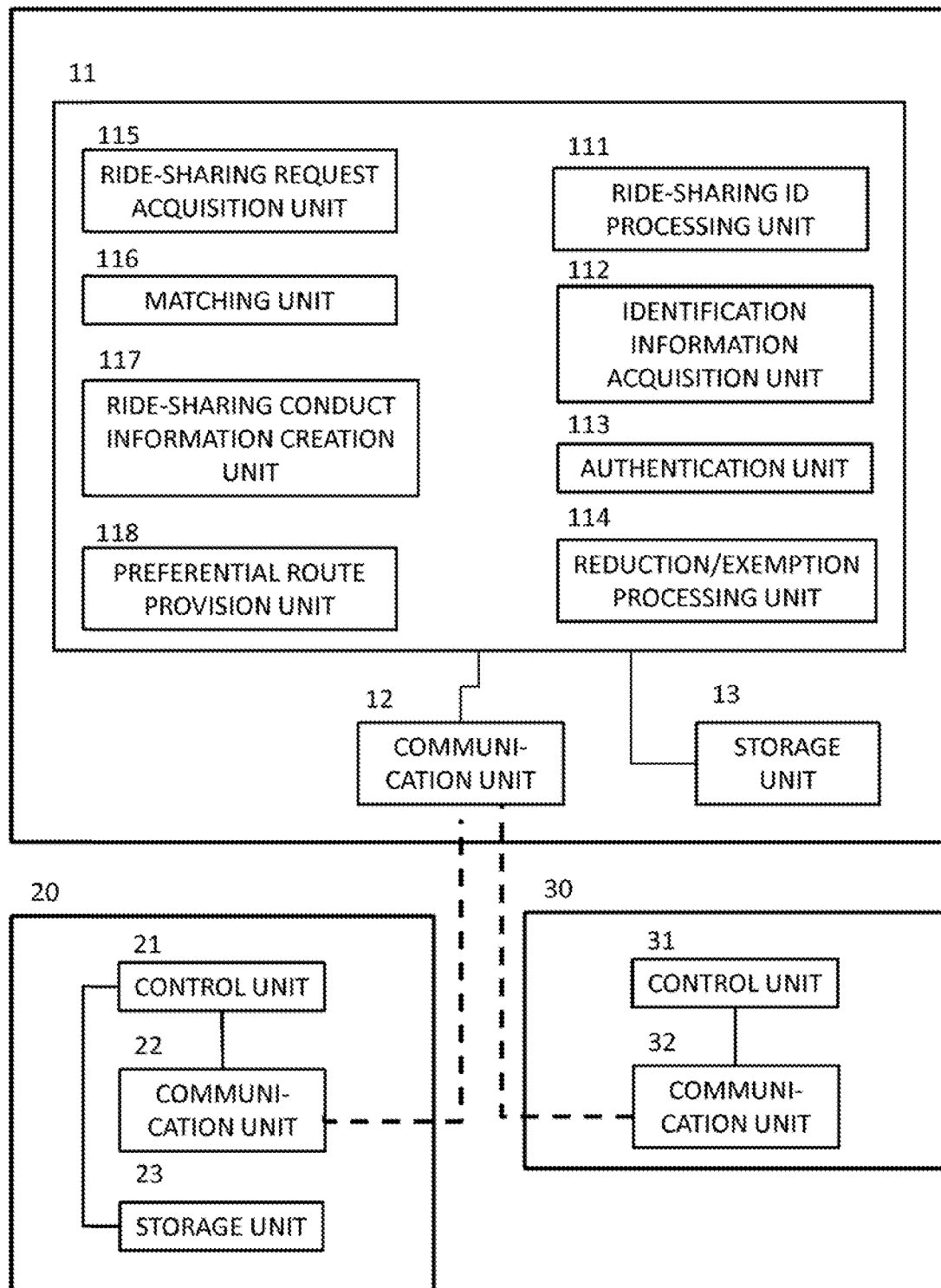
FIG. 11 is a block diagram schematically illustrating an example of constituent elements included in a ride-sharing assist system according to the third embodiment.

Next, a third embodiment of the present system will be described. FIG. 11 is a block diagram schematically illustrating an example of components of a server apparatus 10, a vehicle terminal 20, and an ETC apparatus 30 according to the present embodiment. As illustrated in FIG. 11, the server apparatus 10 includes a preferential route provision unit 118 as a functional module of the control unit 11, in addition to the components in the second embodiment. Other components are similar to the components in the second embodiment.

The preferential route provision unit 118 transmits route information including a toll road on which reduction or exemption is applied to a vehicle terminal 20 mounted on a vehicle conducting ride-sharing. Specifically, a travel route as described below is calculated based on the ride-sharing conduct information created by the ride-sharing conduct information creation unit 117, information on the toll road on which reduction or exemption is applied, map information, and the like. That is, the preferential route provision unit 118 calculates the travel route including the toll road on which reduction or exemption is applied to the vehicle conducting ride-sharing between a departure place and a destination of the ride-sharing (hereinafter, referred to as a preferential route). The preferential route provision unit 118 transmits information on the route to the vehicle terminal 20 via the communication unit 12.

The information on the toll road on which reduction or exemption is applied, the map information, and the like may be stored beforehand in the storage unit 13. Other than the above-mentioned information, road traffic information such as congestion situations of roads is acquired and referred to, and then a preferential route may be set.

The information on the created preferential route may be transmitted together when a ride-sharing ID is transmitted to the vehicle terminal 20, or may be transmitted separately. If there is a longer interval before ride-sharing is conducted, a preferential route may be calculated and transmitted when it is not long before a scheduled date and time for conducing the ride-sharing arrives.

Note that the vehicle terminal 20 having acquired the information on the preferential route may display the route as a route to be preferentially selected by cooperating with a car navigation system. Needless to say that the vehicle terminal 20 may be integrated with the car navigation system into one unit.

Other components and processing in a ride-sharing assist system 3 according to the present embodiment are similar to the components and the processing in the second embodiment, and therefore a description thereof will be omitted. According to the configuration of the present embodiment as described above, a driver can acquire information on a route including a toll road on which a toll is reduced or exempted without looking up personally, and convenience of the system can be enhanced.

Modification Example

Figure 12:
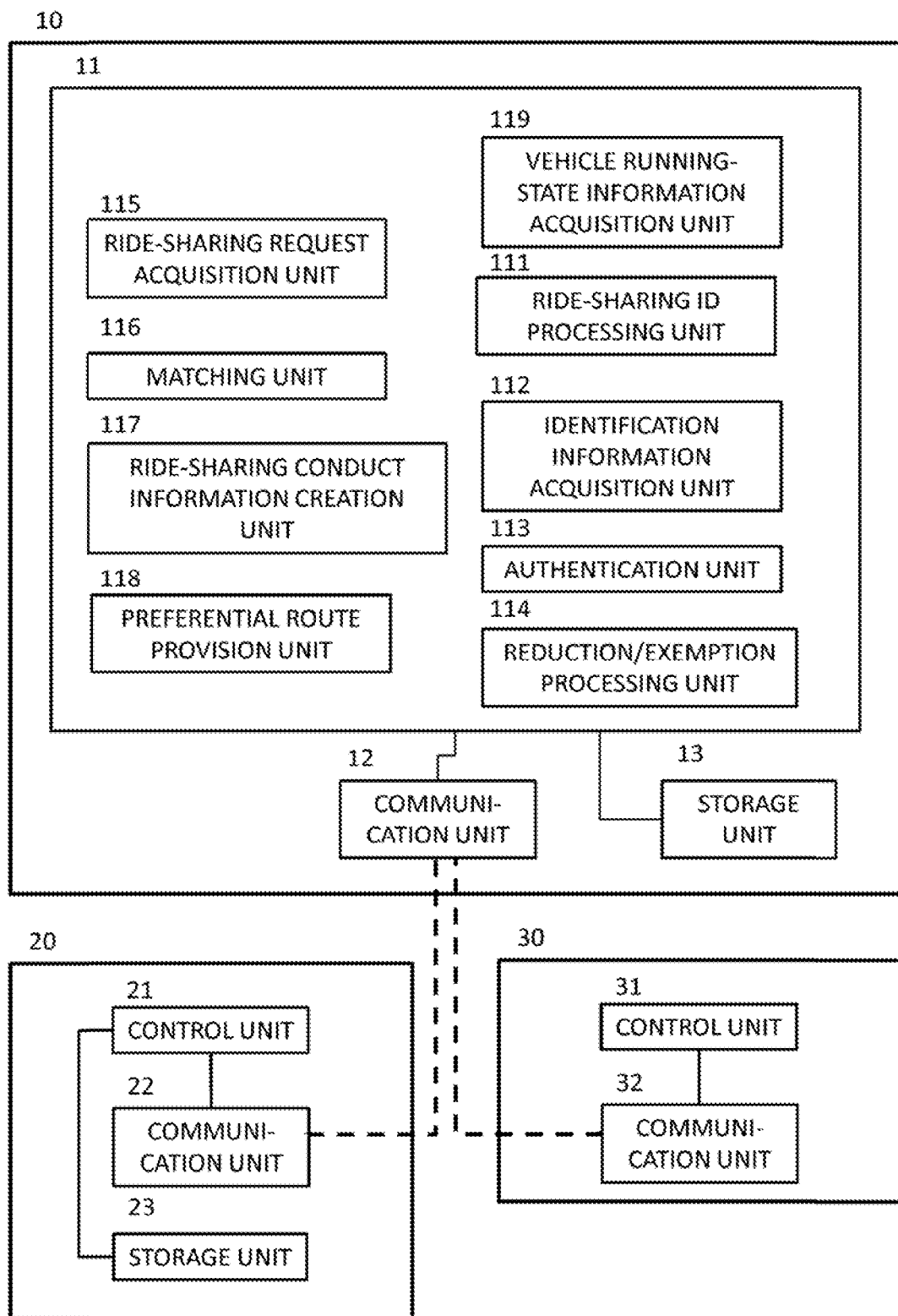
FIG. 12 is a block diagram schematically illustrating an example of constituent elements included in a modification example of the third embodiment.

Note that in setting of the preferential route in the third embodiment, calculation is performed by using the departure place (pick-up place) of the ride-sharing as a starting point, but regardless of such setting, a travel route starting from a current location of the vehicle, passing through the departure place of the ride-sharing, and reaching the destination may be set and transmitted. FIG. 12 depicts a block diagram illustrating an outline of a modification example of the third embodiment. As illustrated in FIG. 12, a server apparatus 10 according to the present modification example includes a vehicle running-state information acquisition unit 119 as a functional module of the control unit 11, in addition to the components in the third embodiment.

The vehicle running-state information acquisition unit 119 acquires information indicating whether or not a vehicle on which a vehicle terminal 20 having a valid ride-sharing ID is mounted is in a running state within a predetermined time period before a scheduled time for starting ride-sharing (pick-up) according to the ride-sharing ID. Here, it may be determined whether or not the vehicle is in a running state, based on information indicating, for example, whether or not a driving source of wheels (engine, motor, or the like) is in a rotating state, whether or not a power supply of in-car equipment is turned on, whether or not a location of the vehicle is changing, or the like. Such information may be acquired by various in-car sensors and transmitted to the server apparatus 10 by the vehicle terminal 20.

Note that "within a predetermined time period before a scheduled time for starting ride-sharing" may be, for example, 30 minutes before a pick-up time in the ride-sharing conduct information until the pick-up time. Needless to say that the predetermined time period before a scheduled time for starting ride-sharing may be 15 minutes before the pick-up time until the pick-up time, or may be one hour before the pick-up time.

If information indicating that the vehicle is in a running state is acquired by the vehicle running-state information acquisition unit 119, the preferential route provision unit 118 acquires information on the then location of the vehicle (that is, information on the current location of the vehicle). The preferential route provision unit 118 calculates a route traveling from the then location to a drop-off place of the ride-sharing via a pick-up place of the ride-sharing and including a toll road on which reduction or exemption of a toll is applied, and transmits information on the route to the vehicle terminal 20.

According to the configuration of the present modification example as described above, since a need of a driver personally looking up a route to a pick-up place is eliminated, the more convenient system can be provided.

Other

Note that each embodiment described above is presented to illustratively describe the present disclosure, and the present disclosure is not limited to the above-described specific aspects. For example, in the second and third embodiments, the matching unit 116 may continue the matching processing even after the ride-sharing conduct information creation unit 117 issues a ride-sharing ID, until vacancy is filled to the capacity for occupants in the driver information. The ride-sharing seeker information may include information about whether or not another passenger can ride together.

In each embodiment described above, preferential treatment given when a vehicle travels along a toll road is reduction or exemption of a toll. However, other preferential treatment can be received. For example, treatment such as granting a coupon that can be used at rest areas on a toll road, traveling on a dedicated driving lane, or using a prime lane at a toll gate may be received.

Further, such preferential treatment may be applicable to others than a toll road. For example, in the third embodiment, when a vehicle conducting ride-sharing travels along a preferential route provided by the preferential route provision unit 118, the vehicle may receive preferential treatment when the vehicle passes through an intersection with traffic lights. The preferential treatment here includes, for example, lengthening a time period for displaying a green light in a traveling direction, shortening a time period for displaying a red light in the traveling direction, lengthening a right turn signal, and the like. Specifically, based on a current location of a vehicle conducting ride-sharing, the server apparatus 10 predicts a traffic light next approached by the vehicle. Further, based on the current location of the vehicle conducting ride-sharing and a location of the predicted next approached traffic light, the server apparatus 10 calculates a time of day at which the vehicle conducting ride-sharing approaches the traffic light. The server apparatus 10 may make instructions to each traffic light, a traffic light management system, and the like so that preferential treatment as above described will be applied at an intersection where the predicted next-approached traffic light is deployed, at the calculated time of day.

Regardless of the preferential treatment at an intersection, for example, if autonomous vehicles are on a preferential route, instructions may be made from the server apparatus 10 to each autonomous vehicle, a autonomous vehicle management system, and the like so that the autonomous vehicles do not interrupt travel of the vehicle conducting ride-sharing. Preferential treatment may allow the vehicle conducting ride-sharing to travel on a bus lane when the vehicle is traveling along a preferential route. In this case, the server apparatus 10 may transmit bus lane travel permission information to the vehicle terminal 20, and the vehicle terminal 20 having received the travel permission information may transmit a travel permission signal indicating that the vehicle can travel on the bus lane, or may display information indicating that the vehicle is permitted to travel on the bus lane on an external display or the like.

The processing and the units described in the present disclosure can be implemented in arbitrary combinations as long as no technical contradict arises. For example, in the second and third embodiments, an ETC apparatus 30 may acquire a ride-sharing ID and may transmit the ride-sharing ID along with an ETC ID to the server apparatus 10, as in the modification example of the first embodiment.

Processing described as being performed by a single apparatus may be divided and performed by a plurality of apparatuses. Alternatively, processing described as being performed by different apparatuses may be performed by a single apparatus. In the computer system, it can be flexibly changed what hardware configuration (server configuration) is used to implement each function.

The present disclosure can also be implemented by supplying a computer program in which the functions described in any of the above embodiments are packaged to a computer, and causing one or more processors included in the computer to read and execute the program. Such a computer program may be supplied to the computer through a non-temporary computer-readable storage medium that can connect to a system bus of the computer, or may be supplied to the computer via a network. Examples of the non-temporary computer-readable storage medium include disks of any type, such as magnetic disks (Floppy® disk, hard disk drive (HDD), and the like) and optical disks (CD-ROM, DVD disk, Blu-ray Disc, and the like), read only memory (ROM), random access memory (RAM), EPROM, EEPROM, magnetic card, flash memory, optical card, and media of any type suitable for storing electronic instructions.

What is claimed is:

1. An information processing apparatus comprising:
a controller configured to:
acquire ride-share identification data identifying that occupants of a vehicle are participating in a ride-share service of ride-sharing provided by a driver of the vehicle;
acquire electronic toll data related to the vehicle, which indicates identification information of the vehicle and whether the vehicle is operating on a toll road; and
in response to the acquired ride-share identification data indicating that all occupants of the vehicle are participating in the ride-share service, and the acquired electronic toll data indicating that the vehicle is operating on the toll road, instruct a management apparatus of the toll road to apply an incentive to reduce fees incurred by operating the vehicle on the toll road.

2. The information processing apparatus according to claim 1, wherein:
the management apparatus of the toll road is an Electronic Toll Collection (ETC) apparatus on the toll road, and the controller is further configured to:
acquire ETC identification information for identifying the ETC apparatus on the toll road; and
based on the acquired ride-share identification information for identifying the vehicle conducting the ride-sharing and the acquired ETC identification information, perform processing for reducing or exempting a toll on the toll road on which the ETC apparatus is deployed for the vehicle conducting the ride-sharing, as the incentive.

3. The information processing apparatus according to claim 2, wherein the controller acquires the ETC identification information on the ETC apparatus approached by the vehicle conducting the ride-sharing, via a terminal apparatus in the vehicle conducting the ride-sharing.

4. The information processing apparatus according to claim 1, wherein the controller acquires the ride-share identification information for identifying the vehicle conducting the ride-sharing via the management apparatus of the toll road approached by the vehicle conducting the ride-sharing.

5. The information processing apparatus according to claim 1, wherein the controller is configured to:
acquire information on a departure place and a destination of the vehicle conducting the ride-sharing;
create a travel route including the toll road on which the incentive is applied between the departure place and the destination; and
provide the created travel route to the vehicle conducting the ride-sharing.

6. The information processing apparatus according to claim 1, wherein the controller is configured to:
acquire information on a pick-up place of the ride-sharing, a destination, and a scheduled time for starting the ride-sharing with respect to the vehicle conducting the ride-sharing;
acquire information indicating that the vehicle conducting the ride-sharing is in a running state within a predetermined time period before the acquired scheduled time for starting the ride-sharing;
acquire information on a current location of the vehicle with respect to which the information indicating that the vehicle is in a running state is acquired;
create a travel route that allows the vehicle with respect to which the information indicating that the vehicle is in a running state is acquired to travel from the current location to the destination via the pick-up place of the ride-sharing, and that includes the toll road on which the incentive is applied; and
provide the created travel route to the vehicle with respect to which the information indicating that the vehicle is in a running state is acquired.

7. The information processing apparatus according to claim 5, wherein the controller is further configured to perform processing for allowing the vehicle conducting the ride-sharing to travel on a bus lane while the vehicle travels along the provided travel route.

8. The information processing apparatus according to claim 5, wherein, when an autonomous vehicle is on the provided travel route while the vehicle conducting the ride-sharing travels along the provided travel route, the controller is further configured to perform processing for causing the autonomous vehicle to change a driving lane of the autonomous vehicle so that travel of the vehicle conducting the ride-sharing is not interrupted.

9. The information processing apparatus according to claim 1, wherein the controller is configured to:
   acquire information on a number of occupants in the vehicle conducting the ride-sharing; and
   determine a content of the incentive based on the acquired information on the number of occupants.

10. An information processing method comprising:
    acquiring ride-share identification data identifying that occupants of a vehicle are participating in a ride-share service provided by a driver of the vehicle;
    acquiring electronic toll data related to the vehicle, which indicates identification information of the vehicle and whether the vehicle is operating on a toll road; and
    in response to the acquired ride-share identification data indicating that all occupants of the vehicle are participating in the ride-share service, and the acquired electronic toll data indicating that the vehicle is operating on the toll road, instructing a management apparatus of the toll road to apply an incentive to reduce fees incurred by operating the vehicle on the toll road.

11. A non-transitory computer readable storing medium recording a computer program for causing a computer to perform an information processing method comprising:
    acquiring ride-share identification data identifying that occupants of a vehicle are participating in a ride-share service provided by a driver of the vehicle;
    acquiring electronic toll data related to the vehicle, which indicates identification information of the vehicle and whether the vehicle is operating on a toll road; and
    in response to the acquired ride-share identification data indicating that all occupants of the vehicle are participating in the ride-share service, and the acquired electronic toll data indicating that the vehicle is operating on the toll road, instructing a management apparatus of the toll road to apply an incentive to reduce fees incurred by operating the vehicle on the toll road.

* * * * *